United States Patent
Strijker et al.

(10) Patent No.: US 8,278,900 B2
(45) Date of Patent: Oct. 2, 2012

(54) SWITCHED MODE POWER SUPPLY WITH BURST MODE CONTROLLER

(75) Inventors: Arjan Strijker, Wijchen (NL); Gerrit Terpstra, Nijmegen (NL); Wilhelmus H. M. Langeslag, Wijchen (NL)

(73) Assignee: NXP B.V., Eindhoven (NL)

( * ) Notice: Subject to any disclaimer, the term of this patent is extended or adjusted under 35 U.S.C. 154(b) by 781 days.

(21) Appl. No.: 11/813,427

(22) PCT Filed: Jan. 5, 2006

(86) PCT No.: PCT/IB2006/050049
§ 371 (c)(1),
(2), (4) Date: Nov. 19, 2009

(87) PCT Pub. No.: WO2006/072917
PCT Pub. Date: Jul. 13, 2006

(65) Prior Publication Data
US 2011/0095730 A1      Apr. 28, 2011

(30) Foreign Application Priority Data
Jan. 7, 2005  (EP) ........................................ 0500183

(51) Int. Cl.
*G05F 1/00*  (2006.01)
(52) U.S. Cl. ............. 323/284; 323/285; 363/78; 363/89
(58) Field of Classification Search .................. 323/207, 323/282, 283, 284, 285; 363/78, 81, 84, 363/89
See application file for complete search history.

(56) References Cited

U.S. PATENT DOCUMENTS

| | | | |
|---|---|---|---|
| 5,747,977 A | 5/1998 | Hwang et al. | |
| 5,903,138 A | 5/1999 | Hwang et al. | |
| 5,960,207 A | 9/1999 | Brown et al. | |
| 6,157,177 A * | 12/2000 | Feldtkeller | 323/267 |
| 6,252,783 B1 * | 6/2001 | Huh et al. | 363/21.01 |
| 6,534,933 B2 | 3/2003 | Shen | |
| 6,967,851 B2 * | 11/2005 | Yang et al. | 363/16 |
| 7,064,968 B2 * | 6/2006 | Choi et al. | 363/97 |
| 2004/0141339 A1 | 7/2004 | Kotsuji et al. | |
| 2004/0174152 A1 | 9/2004 | Hwang et al. | |

FOREIGN PATENT DOCUMENTS

| | | |
|---|---|---|
| EP | 1170853 A2 | 1/2002 |
| EP | 1317052 A2 | 6/2003 |
| WO | 2005013469 A1 | 2/2005 |

OTHER PUBLICATIONS

Preller, Peter; "A New Quasiresonant Controller for Switch Mode Power Supplies Supporting Lowe Power Standby and Power Factor Correction (PFC)" AN-ICE1QS01, Version 2 Application Note, Published by Infineon Technologies, Jan. 2004.
Fairchild Semiconductor "Power Solutions: FPS Fairchild's Power Switch for SMPS".

* cited by examiner

*Primary Examiner* — Adolf Berhane
*Assistant Examiner* — Lakaisha Jackson

(57) ABSTRACT

A power supply includes a PFC stage 6 and an SMPS stage 8. The power supply can operate in a normal mode in which the PFC stage supplies a voltage to the SMPS stage. In a standby mode, the PFC stage is operated in bursts to supply a lower voltage to the SMPS stage that is high enough that the SMPS stage can rapidly respond when it needs to supply a load.

3 Claims, 2 Drawing Sheets

SWITCHED MODE POWER SUPPLY WITH BURST MODE CONTROLLER

The invention relates to a switched mode power supply, a method of operating a switched mode power supply, and a controller for switching a switched mode power supply.

Switched mode power supplies are widely used to supply voltages in applications such as televisions, free-standing mains adaptors and the like.

Switched mode power supplies (SMPS) can be optimised for cost and performance if the input voltage is fixed to within reasonable limits. This can be achieved using a power factor correction (PFC) circuit in front of the SMPS to supply the fixed voltage. Typically, the PFC circuit is a boost converter for supplying a higher output voltage than its input voltage.

It is often required that the power supply operates in standby mode, in which the SMPS should continue to supply the output voltage but at very low load levels. In these conditions the PFC stage can be switched off and the output of the PFC stage is then the same as the rectified input voltage.

This leads to a problem when the load is reconnected, because the SMPS will then need to deliver output power from the rectified mains voltage instead of the normal output voltage of the PFC. This rectified mains voltage may be considerably less than the normal output voltage.

After a brief transitional period, the PFC will be able to deliver its normal output voltage and the SMPS will be able to supply the load from the normal voltage supplied by the PFC. However, in the transitional period, the SMPS will need to supply the full load from a lower input voltage. In order to do this, a higher specification SMPS may be required to avoid an unacceptable voltage drop on the output of the SMPS than would be required to supply the load from the normal output voltage of the PFC. For example, the transformer in the SMPS may need to be larger or the switches in the SMPS may need to have a higher current rating.

This requirement for an uprated SMPS simply to deal with the transitional period increases the costs of the product and it would be desirable to avoid this.

According to the invention, there is provided a power supply comprising a power factor correction stage having power inputs for receiving input power and power outputs for outputting output power at the power factor output stage voltage; wherein the power factor correction stage can be switched between an operating mode and an off mode; and a switched mode power stage having output terminals for supplying output power to a load at a supply voltage and input terminals connected to the power outputs of the power factor correction stage for receiving power at the power factor output stage voltage;

wherein the power factor correction stage can be switched between an operating mode and an off mode;

the power supply is arranged to be switchable between a normal mode and a standby mode; and the power supply further comprises a controller for controlling the power factor correction stage to supply in the normal mode a normal power factor output stage voltage to the switched mode power stage and to operate in the standby mode in a burst mode to supply power in a voltage range below the normal power factor output stage voltage.

By operating the power factor correction stage in a burst mode at a lower output voltage than the normal voltage, the power supply can respond when it suddenly needs to drive the full load again without having a dip in the output voltage or requiring an enhanced capacity SMPS stage.

The power factor correction stage may be a switched mode boost circuit.

In embodiments, the controller is arranged in the standby mode to switch on the power factor correction stage for a burst when the power factor output stage voltage falls below a low burst level and to switch off the power factor correction stage to end the burst when the power factor output stage voltage rises above a high burst level higher than the low burst level, the high and low burst levels both being below the normal power factor output stage voltage.

The controller may include:

a bistable device having an output to control whether the power factor correction stage is in a burst mode or not;

a first comparator for comparing the power factor output stage voltage with the low burst level, the first comparator being connected to the bistable device to switch the bistable device to the burst mode when the power factor output stage voltage falls below the low burst level; and a second comparator for comparing the power factor output stage voltage with the high burst level, the second comparator being connected to the bistable device to switch the bistable device out of the burst mode when the power factor output stage voltage rises above the high burst level.

In another aspect, the invention relates to a switching controller for a power supply having a switched mode power stage having as an input the output of a power factor correction stage on a connection line, the switching controller comprising:

an input for connection, directly or indirectly, to the connection line to input the power factor output stage voltage on the connection line to the switching controller;

a switching output for switching the power factor correction stage; and a control stage arranged to operate in a normal mode to control the power factor correction stage to supply a normal power factor output stage voltage to the switched mode power stage and to control the power factor correction stage to operate in the standby mode in a burst mode to supply power in a voltage range below the normal power factor output stage voltage.

The invention also relates to a method of operating a power supply having a switched mode power stage having as an input the output of a power factor correction stage, comprising:

switching the power supply between a normal mode and a standby mode;

operating the power factor correction stage in the normal mode to supply a normal power factor output stage voltage to the switched mode power stage; and operating the power factor correction stage in the standby mode in a burst mode, including supplying a voltage range below the normal power factor output stage voltage to the switched mode power stage.

For a better understanding of the invention, embodiments will now be described, with reference to the accompanying drawings, in which.

Like components are given the same reference numerals in the different figures.

Figure 1:
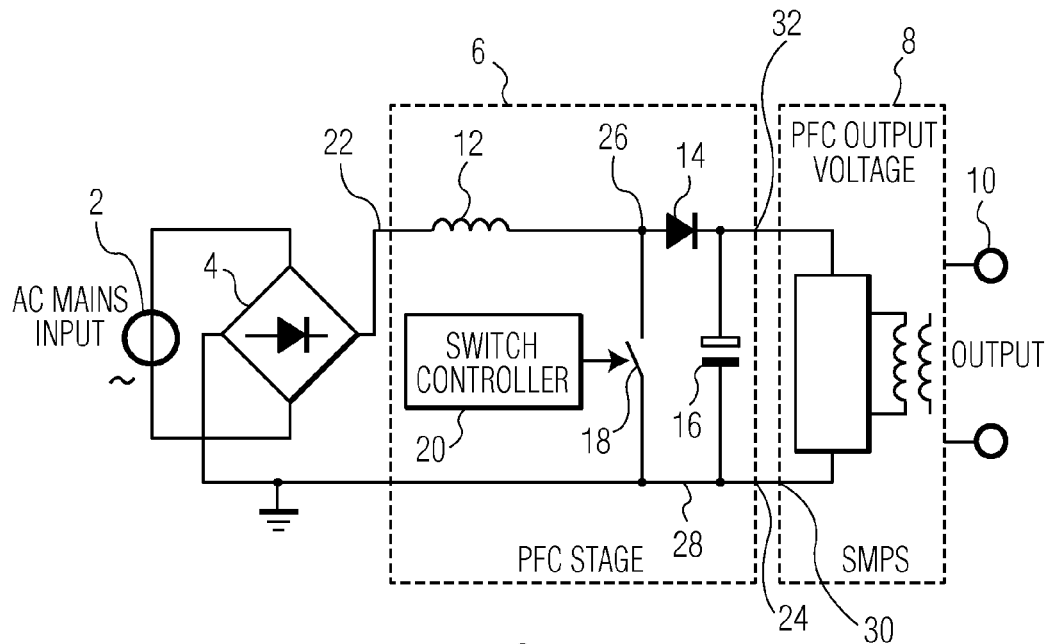
FIG. 1 shows a power supply in accordance with an embodiment of the invention with a power factor correction circuit and a switched mode power circuit.

FIG. 1 illustrates in general terms an embodiment of the invention having an AC input 2, a rectifier 4, a power factor correction (PFC) stage 6 and a switched mode power supply (SMPS) stage 8 feeding an output 10.

The PFC is a boost converter, having inputs 22 connected to the rectifier 4 and outputs 24 connected to the SMPS stage 8. An inductor 12 and a diode 14 are provided in series on a first line 26 between the inputs 22 and the outputs 24, and a capacitor 16 is provided across the outputs. A switch 18 controlled by switch controller 20 is provided with one side of the switch connected to the node between the inductor and the diode and the other side of the switch connected to the other line 28 between the inputs 22 and the outputs 24.

The SMPS stage 8 is a conventional switching power supply shown schematically in FIG. 1, having inputs 30 connected to the PFC stage by connection 32.

Figure 2:
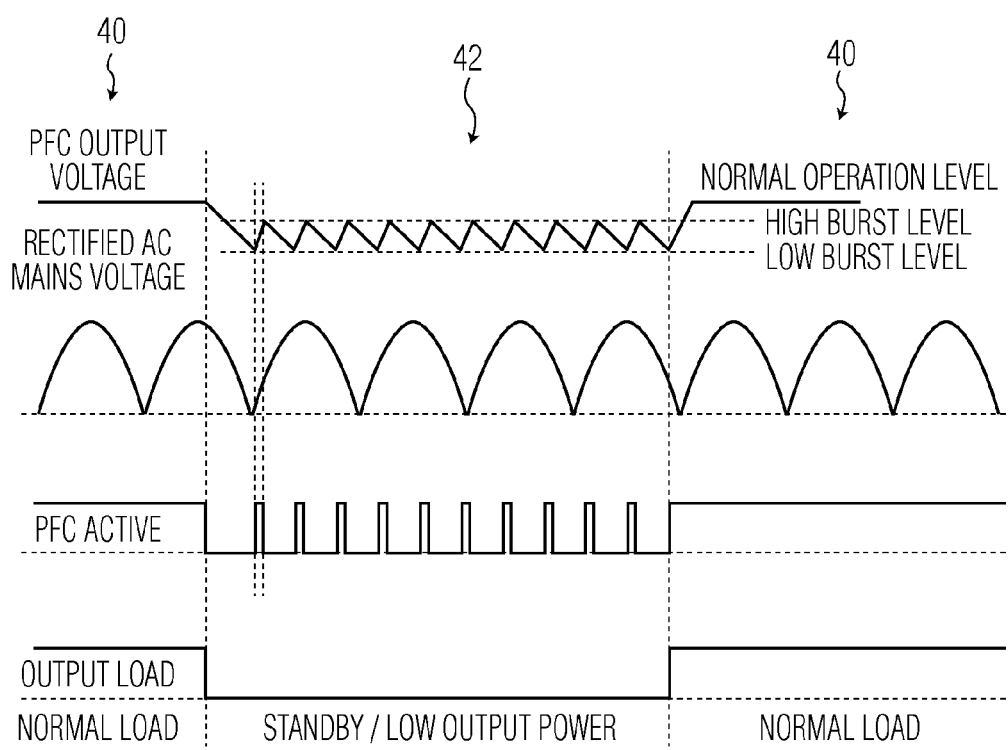
FIG. 2 shows the switching of the circuit in the embodiment of FIG. 1.

FIG. 2 shows the waveforms during normal operation (40) and in a standby mode (42). The graph shows (from top to bottom) the waveforms of the PFC output voltage, i.e. the voltage across connector 32, the rectified mains input voltage, i.e. the voltage at the inputs 22 of the PFC stage, a signal indicating whether the PFC is active and the load.

In normal operation, the PFC stage operates normally to supply a constant normal output voltage in order that the SMPS stage can supply the load. It will be appreciated that in this mode the switch 18 is switched rapidly to achieve the required voltage as will be known to those skilled in the art of boost converters.

When the load is removed, in the standby mode, the PFC stage switches to a burst mode in which the PFC is turned on only when the PFC output voltage falls below a low burst level, and is then turned off again when the output voltage rises above a high burst level. During the periods in which the PFC is turned on, the switch in the PFC is rapidly switched to increase the voltage across capacitor 16 and hence on the output terminals 24 of the PFC stage.

Thus, the PFC output voltage in the standby mode stays between the low burst level and the high burst level, at a level below the PFC output voltage in the normal mode but above the level that the PFC output voltage would fall to if the PFC was switched completely off.

Figure 3:
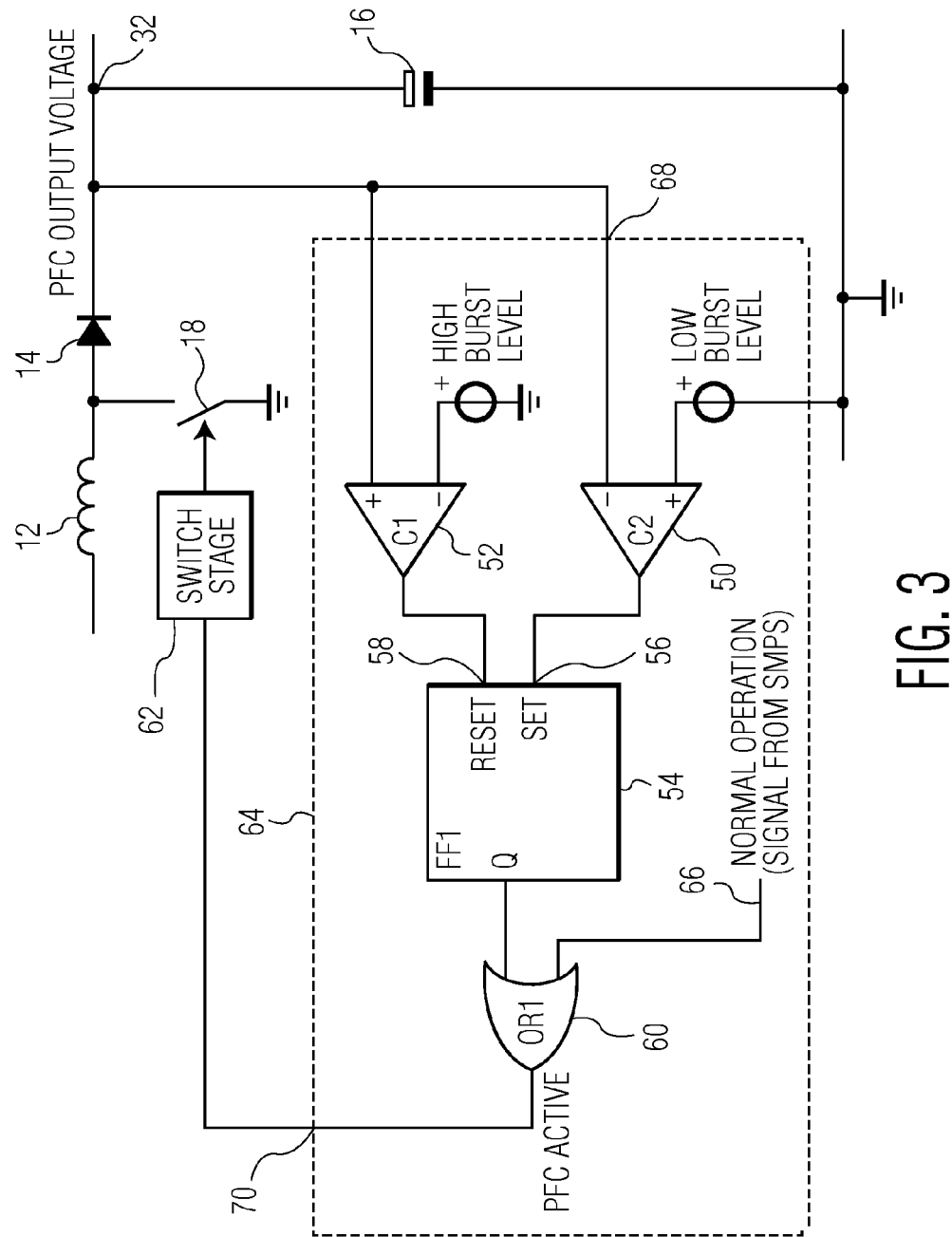
FIG. 3 shows part of the circuit of the embodiment of FIG. 1.

The circuit of FIG. 3 illustrates how this may be achieved.

First comparator 50 compares the PFC output voltage with the low burst level, and second comparator 52 compares the PFC output voltage with the high burst level. The outputs of the first and second comparators 50,52 are taken to the set 56 and reset 58 terminals respectively of a flip-flop 54 which acts as a bistable device.

The outputs of flip-flop 54 are taken through OR-gate 60 which OR's the output with a signal on a normal mode operating line 66 indicating normal operation. This normal mode operating line 66 is connected to a control output (not shown) of the SPMS stage 8. Thus, the PFC operates either when the normal operation signal is applied to line 66 or after the voltage on the output falls below the low burst level until the voltage passes the high burst level.

Switch stage 62 provides the rapid switching required to boost the voltage when the PFC is active. The output of OR gate 60 provides the signal that controls whether switch stage 62 operates. Thus, in effect, the PFC circuit is in an operating, rapidly switching, mode when the power supply is in a normal mode or alternatively when the power supply is in a standby mode and the voltage is outside the required limits.

If the PFC was not turned on at all during the standby mode, the voltage on the connection 32 would fall to a level equal to the smoothed voltage level produced by rectifier 4. Using the invention, the PFC output voltage is maintained at a higher level thereby allowing normal operation of the SMPS to resume very quickly after the SMPS stage starts having to drive a load.

Since the PFC is only operated briefly, in bursts, during the standby mode, the power drawn during standby does not increase excessively. During operation, the PFC switch 18 is switched rapidly on and off to drive the voltage up as in normal boost converter operation.

Conveniently, the low burst level is just above the normal minimum required input of the SMPS stage to supply a normal operation load.

The circuit 64 shown within the dotted lines of FIG. 3 acts as a controller 64 and may be implemented as a separate integrated circuit or chip, as a separate stage, or the functionality may be integrated within the PFC and SMPS stages 6,8. The input 68 to the circuit 64 acts as an input by which the voltage on the connection line 32 is provided to the circuit 64. The controller output 70 of the OR gate controls the switching controller 62 which may be incorporated in the controller 64 or the power factor correction stage 6 as required. The comparators 50,52, flip flop 54 and gate 60 collectively make up a control stage which controls switching controller 62.

Although the term "standby" mode is used this term is intended to include also low power operating states which are not true standby states, merely states where little or no power is being drawn.

The invention is applicable to any application where switched mode power supplies are used, including in particular consumer electronic items with a standby mode such as notebook adapters, LCD TVs or monitors, CRT TVs or monitors, etc.

The invention is applicable to universal mains applications in which the AC mains input voltage varies from as low as 70 V AC to as high as 276V AC. It can occur with higher mains input voltages that the PFC stage maintains the voltage at the SMPS stage above the low burst limit without switching on at all. In this case, the PFC will not switch on at all during standby mode since the voltage is already in the required range.

The skilled person will realise that there are many variations to the above embodiment and the invention is not limited to this embodiment.

In particular, the type of stage for the PFC stage and the SMPS stage may be varied as required.

The invention claimed is:

1. A power supply, comprising:
a power factor correction stage having power inputs for receiving input power and power outputs for outputting output power at a power factor output stage voltage;
wherein the power factor correction stage can be switched between an operating mode and an off mode;
a switched mode power stage having output terminals for supplying output power to a load at a supply voltage and input terminals connected to the power outputs of the power factor correction stage for receiving power at the power factor output stage voltage;
wherein the power supply is arranged to be switchable between a normal mode and a standby mode;
the power supply further comprising a controller for controlling the power factor correction stage to supply in the normal mode a normal power factor output stage voltage to the switched mode power stage and to operate in the standby mode in a burst mode to supply power in a voltage range below the normal power factor output stage voltage;
wherein the controller is arranged in the standby mode to switch on the power factor correction stage for a burst when the power factor output stage voltage falls below a low burst level and to switch off the power factor correction stage to end the burst when the power factor output stage voltage rises above a high burst level higher than the low burst level, the high and low burst levels both being below the normal power factor output stage voltage;

wherein the controller includes:

a bistable device having an output connected to the power factor correction stage to control whether the power factor connection stage is in a burst mode or not;

a first comparator for comparing the power factor output stage voltage with the low burst level, the first comparator being connected to the bistable device to switch the bistable device to the burst mode when the power factor output stage voltage falls below the low burst level; and a second comparator for comparing the power factor output stage voltage with the high burst level, the second comparator being connected to the bistable device to switch the bistable device out of the burst mode when the power factor output stage voltage rises above the high burst level; and an OR gate having as a first input, the output from the bistable device and having as a second input, a signal on a normal mode operating line that is connected to a control output of the switched mode power stage, wherein the OR gate causes the power factor correction stage to operate either when the normal operation signal is applied on the normal mode operating line or after the power factor output stage voltage falls below the low burst level or until the power factor output stage rises above the high burst level.

2. A power supply according to claim 1, wherein the power factor correction stage is a switched mode boost circuit.

3. A switching controller for a power supply having a power factor correction stage and a switched mode power stage, the input of the switched mode power stage being connected to the output of the power factor correction stage on a connection line, the switching controller comprising:

an input for connection, directly or indirectly, to the connection line to input a power factor output stage voltage on the connection line to the switching controller;

a controller output for switching the power factor correction stage; and a control stage arranged to operate in a normal mode to control the power factor correction stage to supply a normal power factor output stage voltage to the switched mode power stage and to control the power factor correction stage to operate in the standby mode in a burst mode to supply power in a voltage range below the normal power factor output stage voltage;

wherein the control stage comprises:

a bistable device having an output for controlling whether the power factor correction stage is in a burst mode or not;

a first comparator for comparing the power factor output stage voltage with the low burst level, the first comparator being connected to the bistable device to switch the bistable device to the burst mode when the power factor output stage voltage falls below the low burst level; and a second comparator for comparing the power factor output stage voltage with the high burst level, the second comparator being connected to the bistable device to switch the bistable device out of the burst mode when the power factor output stage voltage rises above the high burst level; and an OR gate having as a first input, the output from the bistable device and having as a second input, a signal on a normal mode operating line that is connected to a control output of the switched mode power stage, wherein the OR gate causes the power factor correction stage to operate either when the normal operation signal is applied on the normal mode operating line or after the power factor output stage voltage falls below the low burst level or until the power factor output stage rises above the high burst level.

\* \* \* \* \*